United States Patent [19]

Welsh et al.

[11] 4,276,268
[45] Jun. 30, 1981

[54] PROCESS FOR PREPARING MANGANESE NITRATE SOLUTION

[75] Inventors: Jay Y. Welsh, Catonsville, Md.; Alain Mullier, Tertre; Pierre C. Picquet, Mons, both of Belgium

[73] Assignee: Chemetals Corporation, Baltimore, Md.

[21] Appl. No.: 82,581

[22] Filed: Oct. 9, 1979

[51] Int. Cl.³ .............................................. C01G 45/08
[52] U.S. Cl. ...................................... 423/49; 423/393; 423/132; 23/230 A
[58] Field of Search ........................... 423/49, DIG. 5; 23/230 A; 422/111

[56] References Cited

U.S. PATENT DOCUMENTS

| | | |
|---|---|---|
| 1,237,041 | 12/1918 | Kaplan. |
| 2,063,140 | 12/1936 | Allison ................................ 23/230 A |
| 2,374,674 | 5/1945 | Fox et al. . |
| 2,880,070 | 3/1959 | Gilbert et al. ....................... 23/230 A |
| 3,104,946 | 9/1963 | Vial ..................................... 23/230 A |
| 3,462,364 | 8/1969 | Carlson .............................. 23/230 A |
| 3,592,598 | 7/1971 | Cunninghham et al. ........... 23/230 A |
| 3,607,549 | 9/1971 | Bielefeld ............................. 23/230 A |
| 3,780,159 | 12/1973 | Welsh .................................... 423/49 |
| 3,897,540 | 7/1975 | Onnen ................................ 423/242 A |
| 3,899,294 | 8/1975 | Magiros .............................. 23/230 A |
| 4,123,499 | 10/1978 | Welsh et al. ........................... 423/49 |
| 4,162,897 | 7/1979 | Capuano ............................ 23/230 A |

OTHER PUBLICATIONS

Fox et al., "Bureau of Mines, Technical Paper 674," 1945.

Primary Examiner—Herbert T. Carter
Attorney, Agent, or Firm—Keil & Witherspoon

[57] ABSTRACT

A process for preparing manganese nitrate solution by leaching manganese ore containing manganese dioxide in an aqueous slurry containing dissolved nitrogen dioxide gas. The reaction is controlled by monitoring the pH of the aqueous slurry, and adjusting the relative concentration of the manganese ore containing manganese dioxide and/or the rate of addition of nitrogen dioxide containing gas, to establish and maintain the leaching reaction.

10 Claims, 8 Drawing Figures

PROCESS FOR PREPARING MANGANESE NITRATE SOLUTION

FIELD OF THE INVENTION

This invention relates to an improved process for producing manganese nitrate solution from a manganese ore containing manganese dioxide using an aqueous acid solution containing nitrous and nitric acids.

BACKGROUND OF THE INVENTION

A process for preparing manganese nitrate solution from manganese ore containing manganese dioxide is disclosed in U.S. Pat. No. 3,780,159 by Jay Y. Welsh, the disclosure of which is incorporated herein by reference. This prior process is a cyclic process in which manganese ore containing manganese dioxide was contacted and leached with an acid solution prepared by dissolving nitrogen dioxide gas in an aqueous medium. An impure aqueous nitrate solution was recovered, and purified by treatment with an alkaline agent and then heated to decompose the manganese nitrate and obtain substantially pure manganese dioxide, nitrogen dioxide and water vapor. The nitrogen dioxide and water vapor formed by this decomposition were recycled in the prior process.

U.S. Pat. No. 1,287,041 to Kaplan is directed to the leaching of manganese dioxide with nitrogen dioxide to obtain manganese nitrate which is subsequently decomposed. The exposure of powdered manganese ore to nitrogen dioxide in the presence of water is described. Kaplan suggests the use of two or more agitated vessels through which nitrogen dioxide is passed along with some air. The purpose of the air is to oxidize any nitric oxide to nitrogen dioxide. Although Kaplan does not give sufficient detail to indicate process controls, including pH, he apparently considered nitric oxide generation to be a problem to be avoided.

Technical Paper 674 by A. L. Fox (U.S. Department of the Interior, Bureau of Mines 1945) entitled "Semi-Pilot-Plant Investigations of Nitrogen Dioxide Process for Benefication of Manganese Ores" describes a method of leaching low grade manganese ore with nitrogen dioxide to obtain a manganese nitrate solution. Three agitated tanks containing ground manganese ore are described through which nitrogen dioxide is passed in countercurrent fashion. There is no disclosure in the Fox et al. report or in U.S. Pat. No. 2,374,674 by Fox et al. of pH control during leaching of the ore. Fox et al. recycle the manganese nitrate decomposition products, nitrogen dioxide and water vapor, through a high temperature heat exchanger to effect decomposition of the manganese nitrate solution by indirect heating. It is to be noted, however, that the detailed discussion in the above-mentioned Bureau of Mines Report discloses scaling within the decomposition vessel and on the rakes employed to remove the product. This type of operation therefore appears to be commercially impractical.

SUMMARY OF THE INVENTION

An improved process has been discovered for preparing manganese nitrate solution from manganese ore by means of a controlled leaching reaction employing nitrogen dioxide gas as the leaching agent. In the present invention, the rate of absorption of nitrogen dioxide gas relative to the rate of addition of manganese ore containing manganese dioxide into an aqueous medium in a closed reaction tank are adjusted to establish, and maintain, a pH below about 4 in the reaction (leaching) slurry of manganese ore and an aqueous acid solution.

The aqueous acid solution used in the leaching reaction is formed by dissolving nitrogen dioxide in an aqueous medium in the closed reaction tank. The relative rate of absorption of nitrogen dioxide gas to the rate of addition of manganese ore containing manganese dioxide in the closed reaction tank may be adjusted either by varying the rate of introducing nitrogen dioxide gas into the aqueous medium in a closed reaction tank, while introducing the manganese ore into the reaction tank at a constant rate, or by varying the rate of introducing manganese ore into the closed reaction tank, while introducing the nitrogen dioxide gas into the closed reaction tank at a constant rate.

The improved process for preparing manganese nitrate solution according to the present invention preferably takes place in a closed reaction tank under a pressure greater than one atmosphere absolute. Operating the improved process of the present invention under pressure above one atmosphere permits higher nitrous acid concentrations to be maintained in the aqueous acid solution formed by dissolving nitrogen dioxide gas in an aqueous medium. Typically the reaction pressure in a closed reaction tank in the present invention may range up to five, or even ten, atmospheres absolute. Since the rate of leaching in the improved process of the present invention is proportional to the nitrous acid concentration in the leaching slurry, an increased leaching rate can be obtained at higher reaction pressures, which are therefore preferred.

The present invention encompasses the improved process for preparing a manganese nitrate solution operated in conjunction with a nitric acid plant. The improved process of the present invention is particularly suitable for utilizing a portion of the nitrogen oxide containing gases supplied to the absorption tower of a nitric acid plant.

It is an advantage of the present invention that it provides an efficient method of controlling an aqueous acid leaching process for preparing manganese nitrate solution employing nitrogen dioxide as the leaching agent.

It is a further advantage of the present invention that it provides an efficient method of using the pH of the leaching reaction to monitor and control the leaching reaction, without the necessity of adding any external nitric acid to the reaction tank.

It is another advantage of the process of the present invention that it permits leaching manganese ore with an aqueous acid solution formed by dissolving nitrogen dioxide gas in an aqeuous medium under greater than atmospheric pressure, thereby permitting higher nitrous acid concentrations to be attained in the leaching slurry, so that an increased leaching rate is possible.

Still other advantages of the invention will be readily apparent to those of ordinary skill in the art from the Figures and detailed description of the invention which follow.

DETAILED DESCRIPTION OF THE INVENTION

Figure 1:
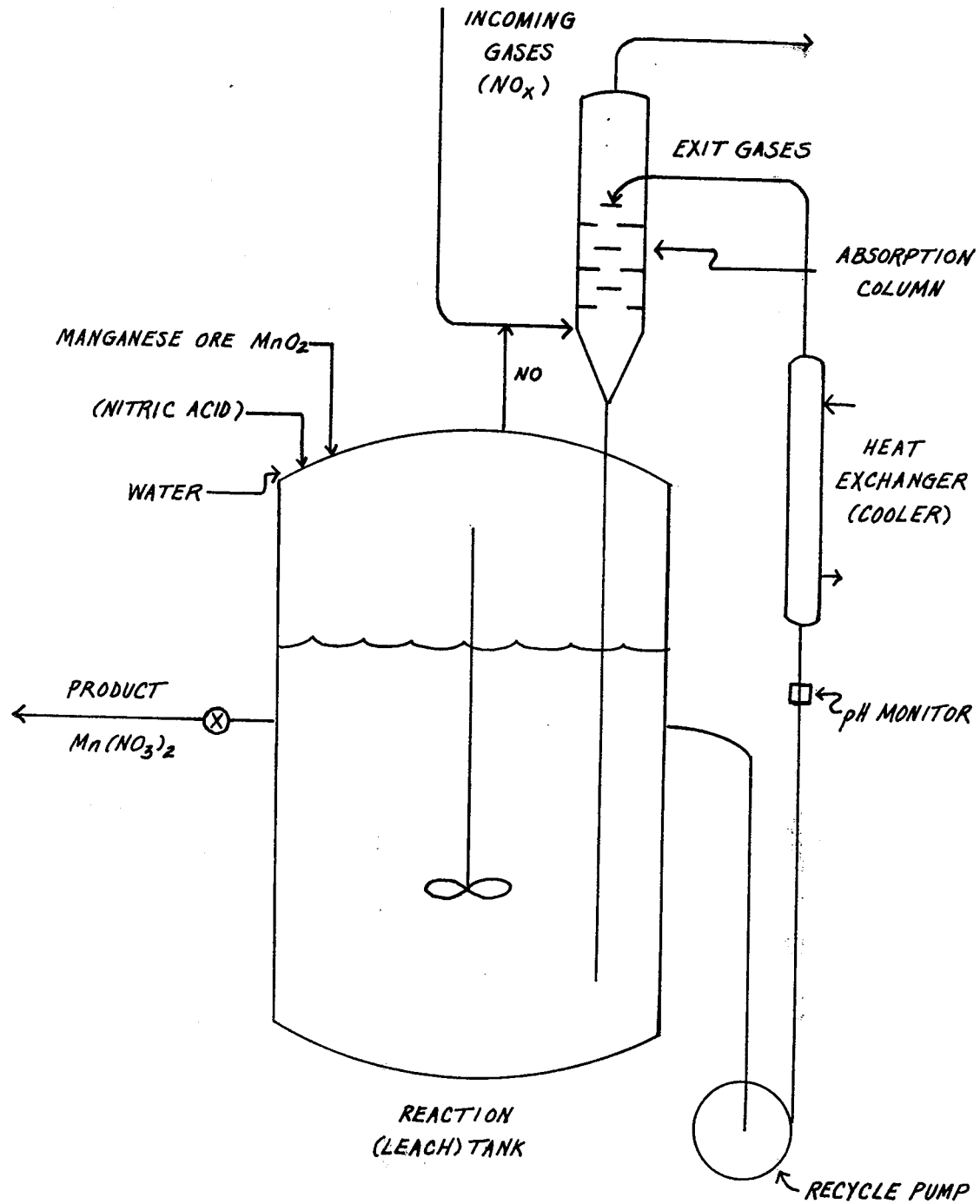
FIG. 1 and FIG. 2 illustrate in simplified form apparatus for conducting the process of the present invention. The apparatus in FIG. 1 is designed for a continuous process, while the apparatus in FIG. 2 is designed to permit batch or semicontinuous operation.

The process for the production of manganese nitrate solution by leaching a manganese ore containing manganese dioxide with nitrogen dioxide gas is now described. Pyrolusite is a suitable manganese ore containing manganese dioxide. In order to better understand the process relationships which form an essential aspect of the present invention, it is desirable to review the chemical reactions involved. When manganese ore containing $MnO_2$ is leached with $NO_2$ gas, the following reactions occur:

$$2NO_2 + H_2O \rightarrow HNO_2 + HNO_3$$

$$MnO_2 + HNO_2 + HNO_3 \rightarrow Mn(NO_3)_2 + H_2O$$

Hence in the absence of side reactions the conversion of $MnO_2$ to $Mn(NO_3)_2$ consumes two moles of $NO_2$. But in addition to $MnO_2$ the manganese ore may also contain MnO and alkaline components such as alkali and alkaline earth oxides and alumina. If MnO or these alkaline components are present the following acid-base reactions will also occur:

$$MnO + 2HNO_3 \rightarrow Mn(NO_3)_2 + H_2O$$

$$(K,Na)_2O + 2HNO_3 \rightarrow 2(K,Na)NO_3 + H_2O$$

$$(Ca,Mg)O + 2HNO_3 \rightarrow (Ca,Mg)(NO_3)_2 + H_2O$$

$$Al_2O_3 + 6HNO_3 \rightarrow 2Al(NO_3)_3 + 3H_2O$$

As will be apparent from the above equations, the reaction with alumina will have the greatest effect on the acid concentration.

The process of the present invention is a non-cyclic or linear process of leaching manganese ore to produce a manganese nitrate solution as the primary product. The noncyclic process of the present invention involves unique process parameters to ensure efficiency which are quite different from the process parameter relationships required by a cyclic process as described in U.S. Pat. No. 3,780,159. To describe the chemical improvement of this invention it is desirable to summarize the various chemical reactions which may be involved, as follows:

$$6NO_2 + 3H_2O \rightarrow 3HNO_2 + 3HNO_3 \qquad (I)$$

$$3HNO_2 \rightleftharpoons HNO_3 + 2NO \uparrow + H_2O \qquad (II)$$

$$MnO_2 + HNO_2 HNO_3 \rightarrow Mn(NO_3)_2 + H_2O \qquad (III)$$

$$2NO_2 + H_2O \rightarrow HNO_2 + HNO_3 \qquad (IV)$$

$$MnO + 2HNO_3 \rightarrow Mn(NO_3)_2 + H_2O \qquad (Va)$$

$$(K,Na)_2O + 2HNO_3 \rightarrow 2(K,Na)NO_3 + H_2O \qquad (Vb)$$

$$(Ca,Mg)O + 2HNO_3 \rightarrow (Ca,Mg)(NO_3)_2 + H_2O \qquad (Vc)$$

$$Al_2O_3 + 6HNO_3 \rightarrow 2Al(NO_3)_3 + 3H_2O \qquad (Vd)$$

Equations I and II, considered together, illustrate the formation of nitric acid and nitric oxide from $NO_2$ and $H_2O$. These reactions therefore result in the lowering of pH due to nitric acid formation. Equations (III+IV) and Va to Vd, considered together, illustrate the leaching of manganese ore with nitrous and nitric acids to form nitrates. The consumption of nitrous and nitric acids in the leaching step represented by equations (III+IV) and Va to Vd results in raising the pH.

In the absence of sufficient $MnO_2$ to react with nitrous acid as illustrated in equation III, excess nitrous acid will accumulate. Although it is possible for nitrous acid to react by more than one mechanism, the reaction illustrated in equation II is most significant.

The non-cyclic process of the present invention involves three rate controlling parameters:

(a) The reaction rate in the leaching step is proportional to the surface area of the manganese ore, since the reaction occurs in a two phase, liquid-solid, system. If the manganese ore is ground to a uniform particle size, the reaction rate in the leaching step is proportional to the amount, or mass, of manganese ore present in the two phase system.

(b) The reaction rate in the leaching step is proportional to the concentration of nitrous acid, $HNO_2$, in contact with the manganese ore surface, as indicated in equation III.

(c) The reaction rate in the leaching step is related to the pH of the reaction system, not only because the reaction rate is related to the concentration of nitric acid, $HNO_3$, in contact with the manganese ore surface as indicated in equation III, but also because the oxidation/reduction driving force of the reaction is increased as the pH is lowered. Note in this regard that nitrous acid concentration has little effect on the pH of the liquid phase. The effect of pH on the oxidation/reduction driving force of the reaction shown in equation III is discussed in U.S. Pat. No. 3,780,159 at column 7, lines 13 to 67, and is incorporated herein by reference. It is seen from the discussion of the oxidation/reduction driving force in U.S. Pat. No. 3,780,159 that the leaching reaction shown in equation II requires a pH not greater than about 4, above which the leaching process will not operate. Of course, the pH of the reaction system will be influenced by the acid forming reactions of equations I and II, which tend to lower pH, and the acid consuming reactions of equations (III+IV) and Va to Vd, which tend to raise pH. It is thus possible to use pH to monitor the process.

In order to obtain a practical and efficient non-cyclic process in accordance with the present invention the following process parameters must be considered:

(1) The concentration of dissolved $NO_2$ gas in the reaction system should be controlled to avoid high local concentrations. High local concentrations of $NO_2$ gas will cause excessive and uncontrolled production of NO gas by the forward reaction shown in equation II, and thereby waste nitrogen values:

$$3HNO_2 \rightleftharpoons HNO_3 + 2NO \uparrow + H_2O \qquad (II)$$

(2) The concentration of manganese ore in the reaction system must be regulated to provide a controlled reaction rate deficiency when the concentration of $MnO_2$ in the reaction system is compared to the concentration of nitrous acid, $HNO_2$. In sharp contrast to the cyclic process described in U.S. Pat. No. 3,780,159, in the present non-cyclic process it is desirable to permit the concentration of nitrous acid to exceed the dynamic equilibrium level relative to the concentration of $MnO_2$ in order to obtain controlled "slippage" between the rate of generation of nitrous acid (equation I) and its rate of utilization in the leaching reaction (equation III):

$$6NO_2 + 3H_2O \rightarrow 3HNO_2 + 3HNO_3 \qquad (I)$$

$$MnO_2 + HNO_2 + HNO_3 \rightarrow Mn(NO_3)_2 + H_2O \qquad (III)$$

The concentration of nitrous acid is said to exceed the dynamic equilibrium level because the atmosphere above the reaction (leaching) solution is deficient in nitric oxide (NO), so that there is a continuing decomposition of nitrous acid to form nitric oxide, as shown by the forward reaction in equation II. The controlled "slippage" between the rate of generation of nitrous acid and its rate of utilization is desirable in the present non-cyclic process in order to obtain controlled production of nitric oxide gas and nitric acid via equation II. This controlled production of nitric oxide gas (via equation II) does not waste nitrogen values because the present process of preparing manganese nitrate solution is particularly suitable for use together with a process for preparing nitric acid. The nitric oxide gas produced in the present process is preferably used in the preparation of nitric acid, as now explained.

The preparation of nitric acid by the oxidation of ammonia is a well-known (see e.g. Mellor's Modern Inorganic Chemistry, pages 405-408 [Longmans Green & Co. 1939]) process comprising:

(a) Oxidizing $NH_3$, in the presence of a suitable catalyst, with excess air to yield NO and $H_2O$;

(b) Cooling the product NO and reacting it with oxygen to produce $NO_2$; and (c) Absorbing the $NO_2$ in an absorption tower in accordance with the following sequence of equations:

$$6NO_2 + 3H_2O \rightarrow 3HNO_3 + 3HNO_2$$

$$3HNO_2 \rightarrow HNO_3 + 2NO + H_2O$$

$$2NO + O_2 \rightarrow 2NO_2$$

et cetera, with the net overall reaction:

$$4NO_2 + 2H_2O + O_2 \rightarrow 4HNO_3$$

Nitric acid can also be manufactured by the high temperature oxidation of atmospheric nitrogen to yield NO followed by steps (b) and (c) as set forth above. It will be seen from these preparations of nitric acid that the controlled production of nitric oxide (NO) gas (via equation II) does not waste nitrogen values because the nitric oxide gas can be used to produce nitric acid. For this reason the process of preparing a manganese nitrate solution according to the present invention is particularly suitable for use together with a process for the preparation of nitric acid as described above.

(3) The pressure in the present reaction system is preferably maintained at the same pressure, generally above atmospheric pressure, as the nitric acid process from which the supply of nitrogen oxide gases is obtained. In addition to avoiding repressuring the gases passing through the absorption column including the nitric oxide gas produced by the present process, before sending it to the nitric acid plant, operating the present process at a pressure above atmospheric pressure permits a higher concentration of $HNO_2$ to be maintained in the leaching slurry. As discussed above, the rate of leaching in the present process is proportional to the concentration of $HNO_2$ in the leaching slurry, so that an increased leaching rate can be obtained at higher nitrous acid concentrations. Therefore operating the present non-cyclic process under above atmospheric pressure permits a higher leaching rate to be obtained than could be obtained in the cyclic process of U.S. Pat. No. 3,780,159, which preferably operated under atmospheric pressure.

(4) The temperature in the present reaction system is controlled to maintain the leach slurry below about 80° C., and preferably in a range from about 30° C. to about 60° C. Temperatures below about 80° C. avoid rapid and uncontrolled formation of nitric oxide from nitrous acid (equation II).

(5) The pH in the present invention system is controlled to maintain the leach slurry preferably below about 3, and most preferably in the range of about 0.0 to about 1.5. As discussed above, the driving force of the leaching reaction (equation III) requires a pH not greater than about 4, above which the leaching process will not operate.

(6) The concentration of manganese nitrate in the leach slurry is controlled to maintain the concentration less than about 50% by weight, and preferably between about 25 to about 35% manganese nitrate by weight.

A variety of equipment designs are possible which are capable of fulfilling the process parameters described above. However, it is convenient to further describe the process parameters with respect to FIG. 1, which illustrates a preferred equipment design in simplified form. A pressurized, agitated reaction (leach) tank is illustrated in FIG. 1. Manganese ore is fed to the reaction (leach) tank at a rate controlled by the pH of the reaction (leach) system. As described above, when the pH of the reaction (leach) system is found to decrease, higher manganese ore feed rates can be used. Alternatively, when the pH in the reaction (leach) system is found to increase, the manganese ore feed rate is lowered. A pH monitor is shown in FIG. 1.

Gases containing nitrogen dioxide ($NO_2$) gas are brought into contact with the aqueous medium of the reaction (leach) tank as illustrated in FIG. 1. Water is added to control the manganese nitrate concentration. The feed rate of $NO_2$ gas may alternately be controlled by the pH monitor. When the pH monitor indicates that the pH is lower than a predetermined set point, the feed rate of the $NO_2$ gas is lowered. Alternatively, when the pH monitor indicates that the pH in the reaction (leach) system is higher than the set point, the feed rate of the $NO_2$ gas is increased.

The reaction (leach) tank is also equipped by means of an absorption column to accept incoming nitrogen oxide gases from the oxidation of ammonia ($NH_3$) in a nitric acid plant. As described above, the nitrogen dioxide containing gases from a nitric acid plant are under greater than atmospheric pressure, and so enter the absorption column under greater than atmospheric pressure. Gases exiting from the reaction (leach) tank itself may still contain residual nitrogen oxide gases, including controlled quantities of nitric oxide (NO) gas, and can therefore be returned to a nitric acid plant associated with the present process for preparing manganese nitrate solution. Since the nitric acid plant, as described above, is operated under greater than atmospheric pressure, the exit gas sent to the nitric acid plant are under greater than atmospheric pressure.

The product manganese nitrate solution leaves the reaction (leach) tank in a slurry containing residual manganese ore and ore gangue.

A recycle pump circulates fluid from the reaction (leach) tank through the pH monitor, a heat exchanger, and an absorption column, then returning the fluid to the reaction (leach) tank.

Four process parameters are designed into the above-described equipment:

1. The recycle pump is designed to circulate a large volume of fluid through the absorption column. The fluid passing through the absorption column is contacted with nitrogen dioxide containing gases from the ammonia burner, and may absorb large quantities of nitrogen dioxide gases. By designing the recycle pump to recirculate a large volume of fluid through the absorption column, the fluid containing relatively high concentrations of dissolved nitrogen dioxide gas is quickly returned to the reaction (leach) tank where it is rapidly dispersed and diluted, thereby avoiding the uncontrolled formation of nitric oxide (NO) gas by the forward reaction of equation II, as described above.

2. The agitated reaction (leach) tank immediately disburses the recycle fluid containing freshly dissolved nitrogen dioxide gas, bringing it or its reaction products (equation IV) into contact with the manganese ore in the reaction (leach) tank. Virorous agitation of the fluid containing dissolved nitrogen dioxide gas or its reaction products aids in diffusion of the dissolved reactants to reach the surface of the manganese ore, thereby enhancing the leaching reaction.

3. The heat exchanger in the recycle system permits temperature control of the fluid in the reaction (leach) system within the limits described above.

4. The reaction (leach) tank is a closed vessel with no inert gas sweep, thereby permitting an equilibrium to be maintained between nitrous acid and nitric oxide gas (equation II).

The four design features incorporated into the equipment permit the process of the present invention to operate with a controlled generation of nitric oxide (NO) gas. In the practical commercial operation of the present process, it will be found that the pressure in the reaction (leach) system will be determined by the operating pressure of the nitric acid plant to which the present process may be appended. As the above discussion suggests, the process of the present invention can be controlled by variation in the rate of feed of nitrogen dioxide gas, or variation in rate of feed of manganese ore, varied in accordance with the pH of the reaction (leach) system. The relationship between the rate of feed of manganese ore and the pH of the reaction (leach) system is summarized in the following chart.

| Controlled Parameter | Dependent Changes | Variables Held Constant |
|---|---|---|
| Higher ore level in slurry | Higher pH (less Al$_2$O$_3$ leached) | Operating Pressure Temperature |

-continued

| Controlled Parameter | Dependent Changes | Variables Held Constant |
|---|---|---|
| | Less NO(HNO$_3$) generation Faster overall leaching rate. (More equation III, less equation II) Lower % of Mn leached relative to ore | NO$_2$ feed rate or ore feed rate |
| Lower ore level in slurry | Opposite of above. | Same |
| Lower pH | Higher leaching rate per unit of ore More required HNO$_3$ More Al$_2$O$_3$/Fe$_2$O$_3$ leaching relative to ore (higher Mn leaching efficiency) | Temp. ore level operating pressure NO$_2$ feed rate or ore feed rate. |

It will be apparent from the above chart and the preceding discussion that the ore concentration in the reaction slurry and the pH are closely related. We have found that the process of preparing manganese nitrate solution according to the present invention can be controlled by controlling the ratio of the acid forming reactions (equations I and II) and the leaching reactions (equations (III+IV) and Va to Vd). As will be seen from equations I and II, considered together, and equations (III+IV) and Va to Vd, considered together, the relative rates of these reactions determines the pH of the reaction (leaching) slurry. The relative rates of these reactions are, in turn, controlled by the ore concentration in the reaction (leaching) slurry. Thus, because of this correlation, the pH of the reaction (leaching) slurry can be monitored and used to control the rate at which manganese ore is fed to the reaction (leach) tank. Using a pH monitor to indicate the relative rates of the acid forming reactions to the leaching reactions is quite different from using pH to control the reaction rate by direct adjustment of the pH. That is, after initial addition of nitric acid to adjust the pH of the reaction (leach) system to the desired set point, no further acid or alkaline agent is added to maintain the pH. Rather, the pH of the reaction (leach) system is maintained by variation in the rate of feed of manganese ore, if the feed rate of nitrogen dioxide gas is constant, or alternatively variation in the rate of feed of nitrogen dioxide gas, if the feed rate of manganese ore is maintained constant.

There are several advantages to using the pH of the reaction (leach) mixture to monitor the relative rates of the acid forming reactions (equations I and II) compared to the leaching reactions (equations (III+IV) and Va to Vd). Using the pH of the reaction (leach) system to monitor the leaching reaction permits the present process of preparing a manganese nitrate solution to be used in a wide variety of operating conditions:

(a) The rate of leaching per unit of leach tank volume can be varied between less than about 0.005 kilograms ore per liter per hour to about 0.2 kg ore per liter per hour. At higher leaching rates within a given tank at a given pressure the ore content per unit volume in the slurry must be higher in order to maintain the same relative reaction ratio. However, the proper ore level can be found and regulated by controlling, for example, the manganese ore feed rate. Because the proper reaction ratio is indicated by the pH of the reaction system, which is readily measured, the present invention provides reliable, dynamic process control. The rate of leaching per unit of reaction (leach) tank volume is of course also related to the rate at which $NO_2$ is absorbed into the reaction (leach) system. If the manganese ore feed rate is held constant, a variation in feed rate of the gases containing $NO_2$ can shift the manganese ore concentration up or down, and in turn vary the reaction ratio of the acid forming reactions (equations I and II) and leaching reactions ((III+IV) and Va to Vd), and hence affect the pH of the reaction (leaching) system. Hence the process of the present invention contemplates monitoring the pH of the reaction (leaching) system and controlling the process either by variation in the rate of feed of manganese ore (at a constant nitrogen dioxide gas feed rate), or by variation in the rate of feed of nitrogen dioxide gas (at a constant manganese ore feed rate). Either alternative permits control of the present process of preparing a manganese nitrate solution by monitoring the pH of the reaction (leaching) system.

(b) monitoring the pH of the reaction (leaching) system will detect any changes in temperature of the reaction system, or manganese ore particle size. Suitable adjustments in the rate of feed of manganese ore (or nitrogen dioxide gas feed) can easily by made.

(c) Monitoring the pH of the reaction (leaching) system permits rapid detection of varying alkaline reactions (equations Va to Vd) caused by different levels of alkaline and MnO impurities in the manganese ore. Again, the relative reaction rates of the acid forming reactions (equations I and II) and the leaching reactions (equations (III+IV) and Va to Vd) can be adjusted by adjusting the feed rate of the manganese ore, or the nitrogen dioxide feed rate, as discussed above.

It is also contemplated within the scope of the present invention that a controlled amount of nitric acid may be added to the reaction (leach) tank to react with a controlled portion of alkaline impurities or MnO in the manganese ore. This option is desirable because it permits higher production efficiency, that is, a higher percentage of the nitrogen dioxide gas absorbed can be utilized in the production of manganese nitrate solution since less nitric acid must be generated. It is to be understood that this controlled addition of nitric acid is simply to react with a portion of the alkaline impurities and/or MnO which may be present in the manganese ore (equations Va to Vd), and is not to control the course of the leaching reaction, as discussed above.

EXAMPLES

Figure 2:
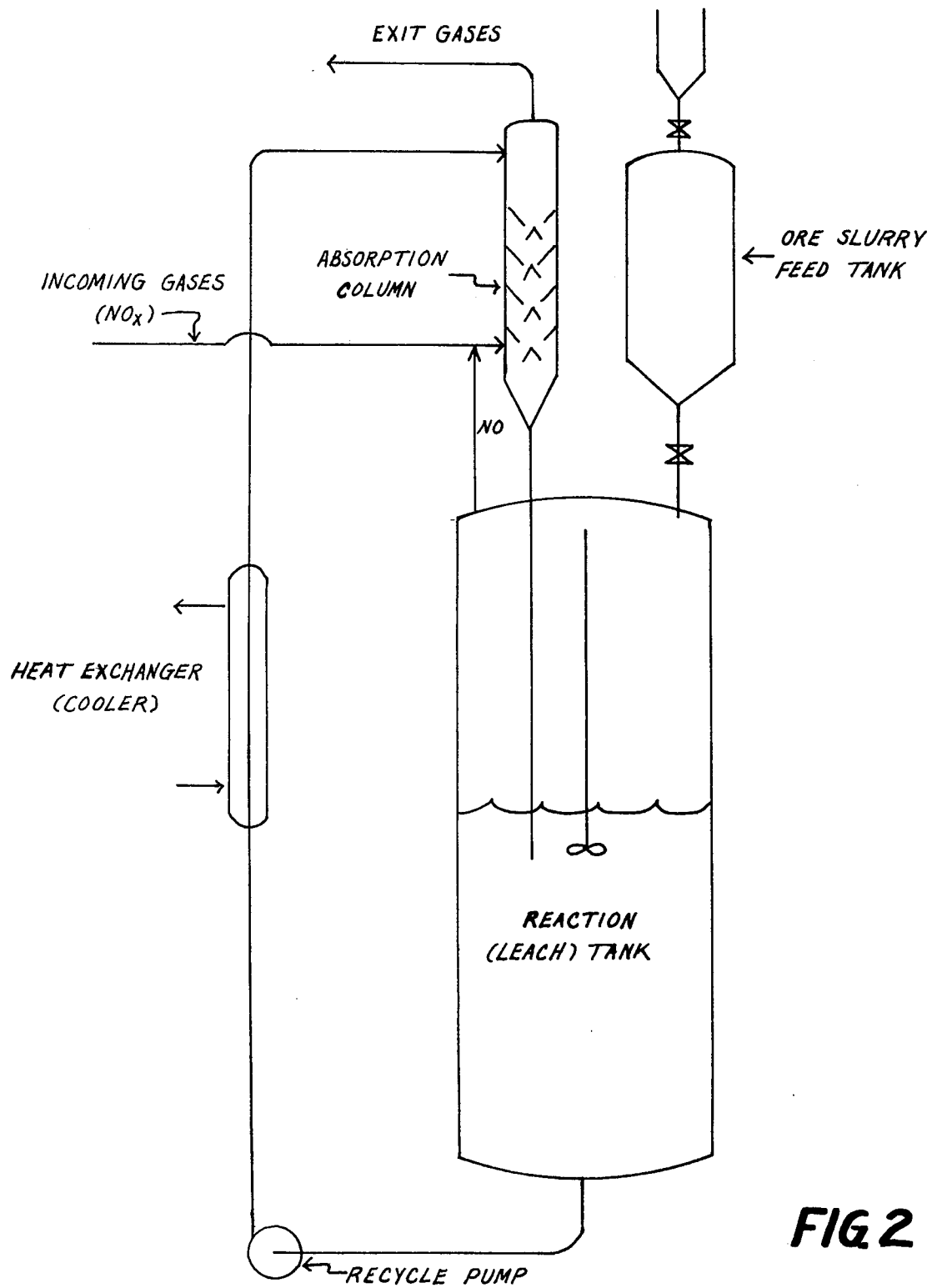

Five examples demonstrate the relationship between unreacted manganese ore concentration in the reaction (leach) tank and the ratio of the rate of acid producing reactions (equations I and II) and leaching reactions ((III+IV) and Va to Vd). These five examples were conducted in the apparatus illustrated in FIG. 2. It will be observed that the apparatus illustrated in FIG. 2 is equipped with a pressurized ore slurry feed tank to permit semi-continuous operation. Two sets of experiments were conducted using the apparatus of FIG. 2: One set of experiments run on a batch process basis, and the other set of experiments run on a semi-continuous process basis. The data from the batch process runs are summarized in graphical form in FIGS. 3, 4 and 5. All of the experiments were run at the same pressure (4 atmospheres absolute); at about the same temperature (within ±4° C.), and at approximately the same liquid and gas flow rates through the absorption column. In the batch process runs all of the manganese ore and water and initial nitric acid to adjust the pH were added to the reaction (leach) tank at the start of the run with no further additions through the run. In the case of the semi-continuous process runs, in an initial phase the runs were carried out in a manner similar to the batch runs in order to establish the desired concentration levels of soluble manganese ($MN^{+2}$), and unleached manganese ore ($MnO_2$), but no nitric acid was added to the reaction (leach) tank. When these desired concentrations were attained, a portion of leach slurry was removed (approximately 18 liters) and an equal volume of fresh slurry containing 5 kilograms of manganese ore was added through the pressurized ore slurry feed tank illustrated in FIG. 2. It may be noted that the semi-continuous operating volume of the reaction (leach) tank illustrated in FIG. 2 was approximately 235 to 270 liters. The incremental removal and addition of fresh manganese ore slurry was made as frequently as necessary to maintain the pH of the reaction (leaching) slurry between 0.3 and 0.5. It is clear that the results of the semi-continuous process runs demonstrate that the process of preparing a manganese nitrate solution according to the present invention can be run on a continuous basis with suitable apparatus.

Figure 3:
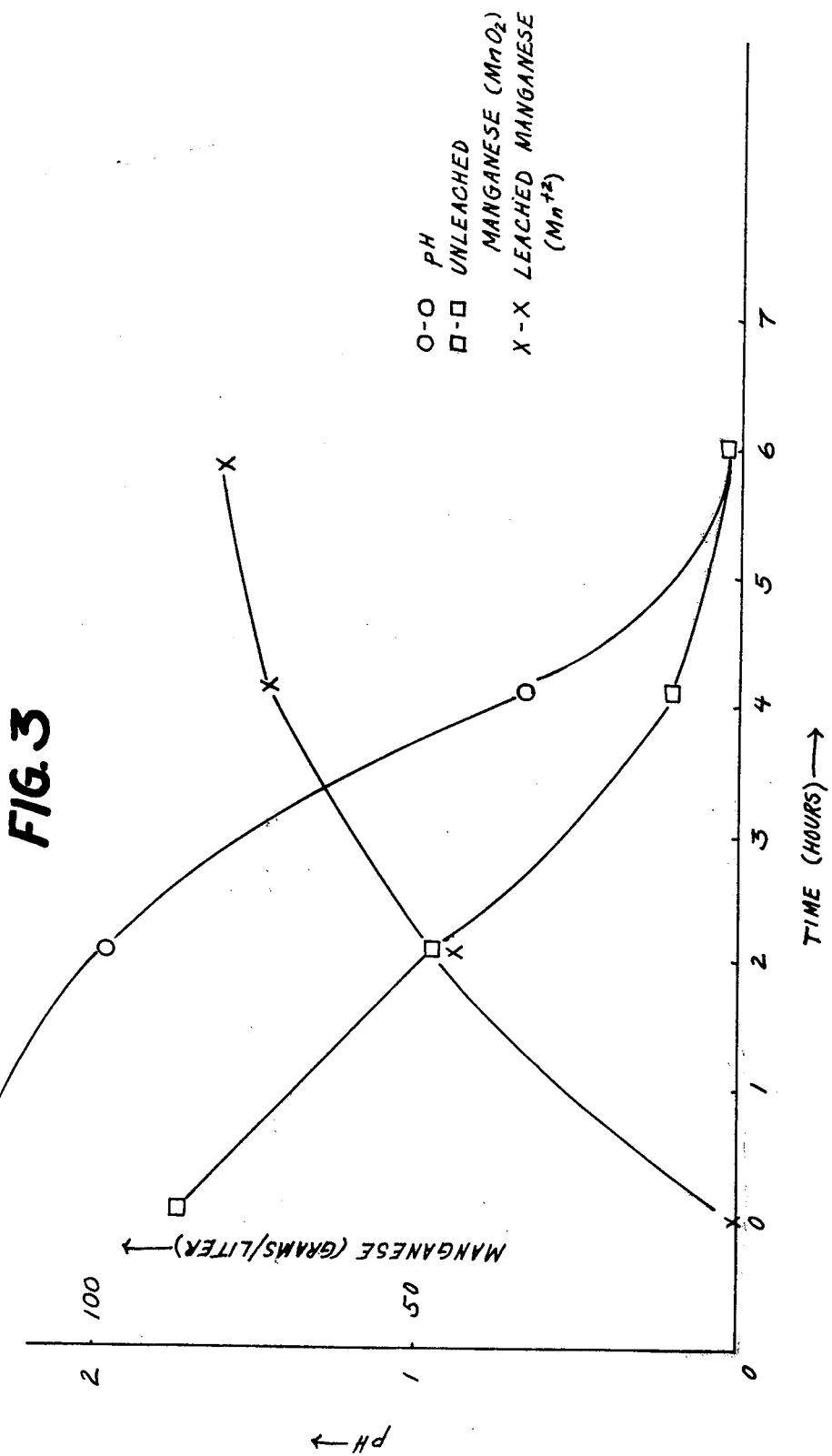
FIGS. 3, 4 and 5 summarize in graphical form data from batch process runs conducted in the apparatus illustrated in FIG. 2.
Figure 4:
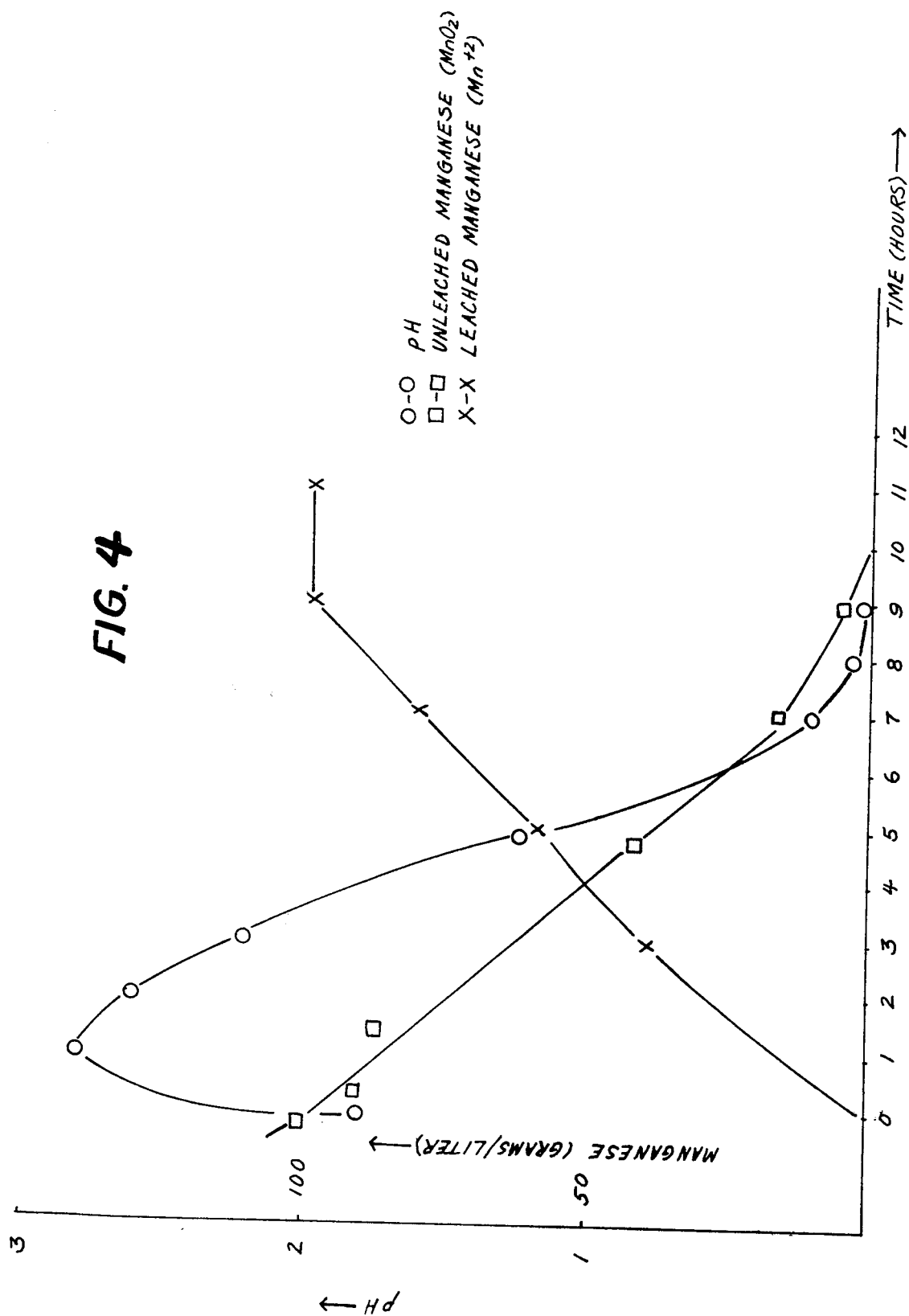
Figure 5:
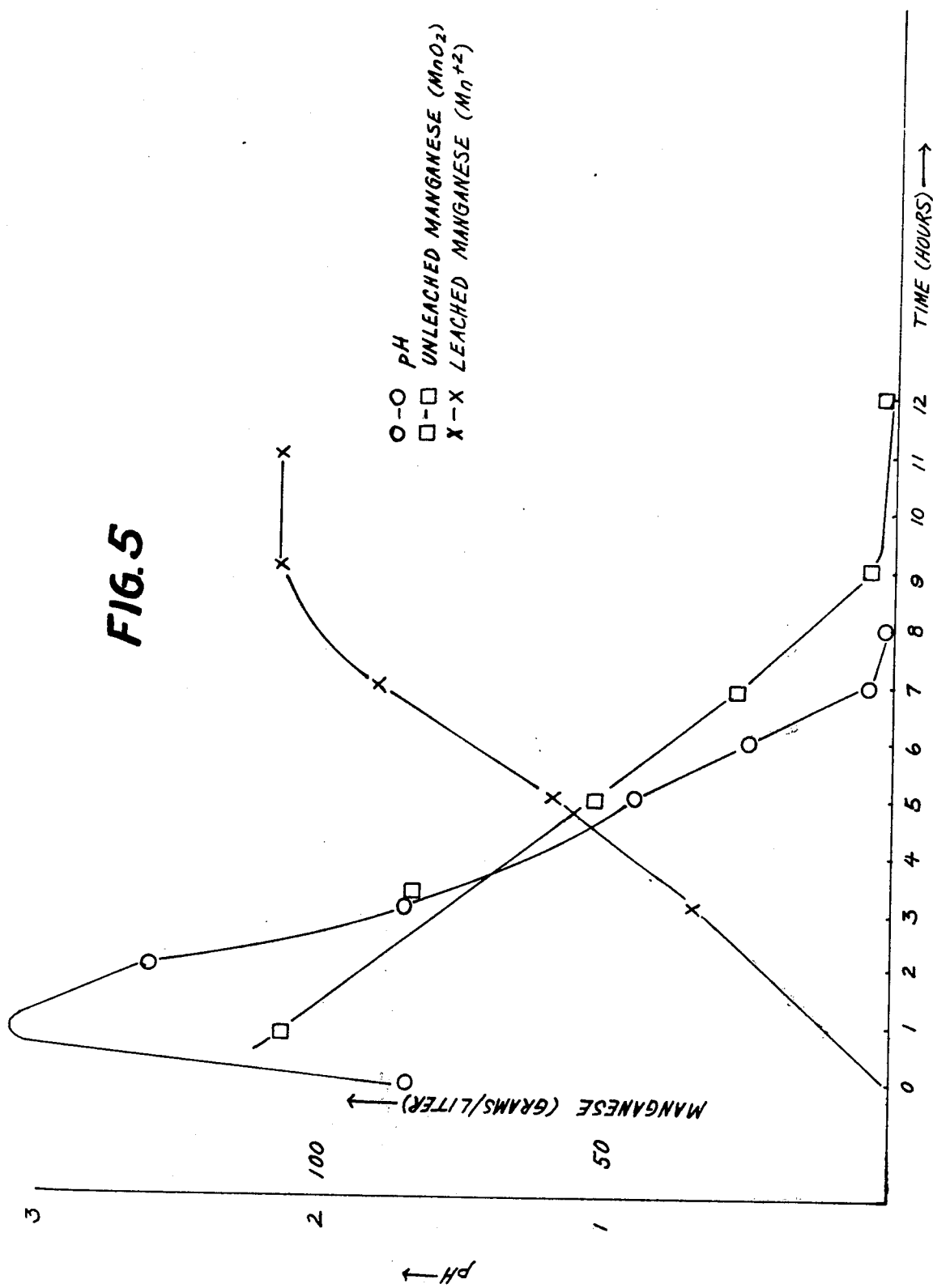

The batch process basis illustrated in FIGS. 3, 4, and 5 demonstrate the inverse relationship between the acid producing reactions (equations I and II), and the concentration of unleached manganese ore ($MnO_2$). This is especially evident in FIGS. 4 and 5 where nitric acid was initially added to the reaction (leaching) slurry to adjust the pH to less than 2. It will be observed in FIGS. 4 and 5 that during approximately the first hour of these runs, the acid producing reactions (equations I and II) were almost totally absent so that the pH was rapidly increased by the leaching reactions ((equations III+IV) and Va to Vd). It was observed that while the leaching reactions had leached over 60 grams of soluble manganese per liter, the acid producing reactions had generated an excess of only about 5 to 6 grams of nitric acid per liter. As the concentration of unreacted manganese ore fell to a lower level, the data indicate a rapid increase in nitric acid concentration. In the experiments illustrated in FIGS. 3, 4 and 5 approximately 50 to 60 grams of nitric acid per liter were produced during the leaching of the last 20 to 30 grams of soluble manganese per liter. The experimental conditions of the batch processes illustrated in FIGS. 3, 4 and 5 are listed below:

FIG. 3

Reaction tank contents:
 270 liters of water
 50 kilograms of manganese ore
Reaction temperature = 30° C.
Reaction pressure = 4 atmospheres absolute
Slurry recycle = 3600 liters per hour
Total gas flow rate = 79.5 cubic meters per hour (STP);
 $NO_x$ content about 9% by volume

FIG. 4

Reaction tank contents:
 360 liters of water
 100 kilograms of manganese ore
Reaction temperature = 36° C.
Reaction pressure = 4 atmospheres absolute
Slurry recycle = 4020 liters per hour
Total gas flow rate = 86.4 cubic meters per hour (STP);
 $NO_x$ content about 9% by volume

FIG. 5

Reaction tank contents:
  360 liters of water
  100 kilograms of manganese ore
Reaction temperature = 36° C.
Reaction pressure = 4 atmospheres absolute
Slurry recycle = 3900 liters per hour
Total gas flow rate = 86.4 cubic meters per hour (STP); $NO_x$ content about 9% by volume In each case $NO_x$ refers to a mixture of nitrogen oxides, predominantly comprising nitrogen dioxide, typically used in the production of nitric acid as explained above.

Figure 6:
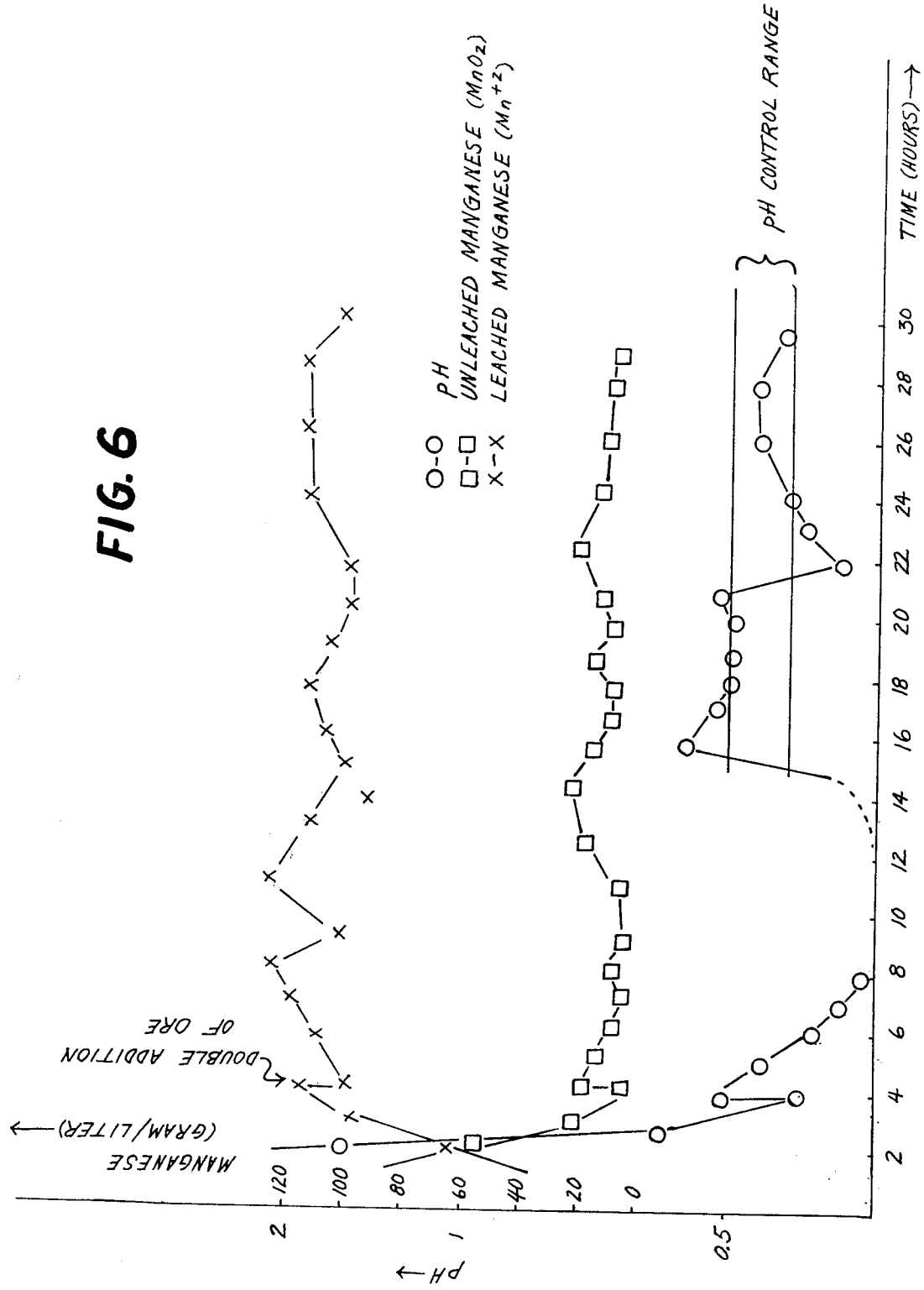
FIGS. 6 and 7 illustrate in graphical form data from semi-continuous process runs under greater than atmospheric pressure. In both semi-continuous process runs the rate of introduction of manganese ore feed was used as the means for controlling the concentration of excess manganese ore.
Figure 7:
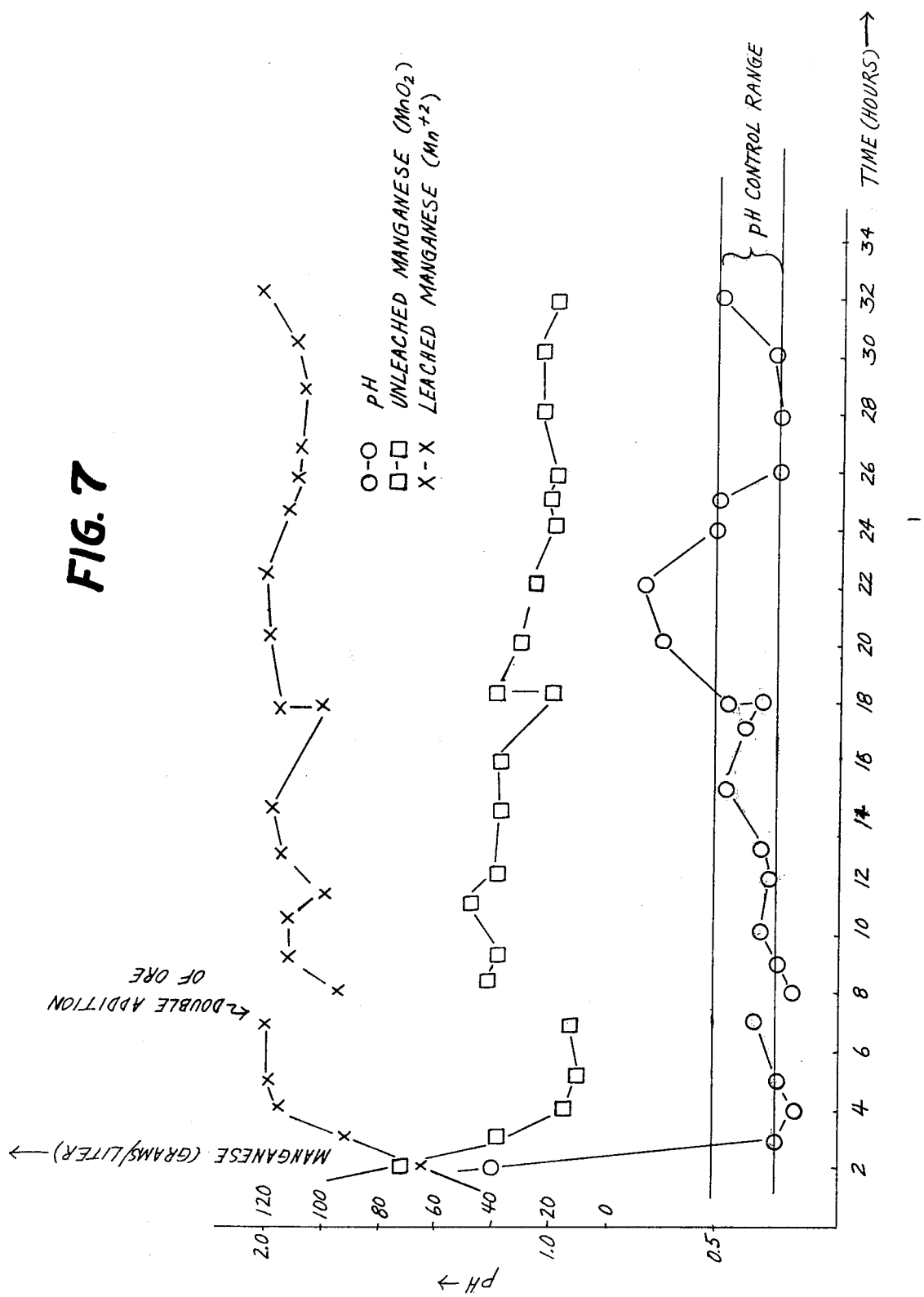

FIGS. 6 and 7 illustrate semi-continuous process runs according to the present invention. In both semi-continuous process runs it was convenient to use the manganese ore feed rate as the means for controlling the concentration of excess manganese ore (unleached manganese), rather than controlling the nitrogen dioxide gas feed rate. It is of course understood that the same results can be obtained if the nitrogen dioxide feed rate is varied against a constant manganese ore feed rate.

It is seen from FIG. 6 that in the early states of the semi-continuous process run the correct manganese ore feed rate had not yet been determined, and that a period of about 12 hours elapsed before the correct manganese ore feed rate was established. The pH target set for this experiment was between about 0.3 and 0.5. During the early stages of the semi-continuous process run the manganese ore concentration (about 5 grams ore per liter) was insufficient; it is seen that the pH decreased to about 0. While the process of the present invention can be conducted at a pH of 0, or even less, a goal of these experiments was to maintain the selected pH target range of 0.3 to 0.5. When the manganese ore concentration was increased to about 15 grams ore per liter after 12 hours the pH control range was attained. It is seen from FIGS. 6 and 7 that the manganese ore feed rate can be adjusted to cause the process to operate within the selected pH target range. It is observed in FIGS. 6 and 7 that the unleached manganese ore concentration remains relatively constant after the manganese ore feed rate is adjusted to operate the process within the selected pH target range. As discussed above, varying the rate of feed of manganese ore causes a variation in the concentration of the unleached manganese ($MnO_2$) in the reaction (leaching) slurry, which in turn shifts the ratio of the leaching reaction ((equations III+IV) and Va to Vd) relative to acid forming reactions (equations I and II), bringing the pH of the reaction (leaching) slurry into alignment with the target pH value. FIGS. 5 and 6 also illustrate the expected time lag between changes in the rate of feed of manganese ore, and corresponding changes in the measured pH of the reaction (leaching) slurry. The experimental conditions used in the semi-continuous process runs illustrated in FIGS. 6 and 7 are listed below:

FIG. 6

Reaction tank contents:
  Initial liquid volume in reaction (leaching) tank = 195 liters
  Semi-continuous liquid volume in reaction (leaching) tank = 235 liters
  Reaction temperature from 30° to 37° C., average temperature equals 34.2° C.
  Reaction pressure = 4 atmospheres absolute
  Slurry recycle = 3600 to 3840 liters per hour
  Total gas flow rate = 80 cubic meters per hour (STP); $NO_x$ content about 9% by volume
  Incremental manganese ore slurry additions = 5 kilograms manganese ore in 18 liters water No nitric acid was initially added in this experiment; $NO_x$ gas is as previously defined.

FIG. 7

Reaction tank contents:
  Initial liquid volume in reaction (leaching) tank = 195 liters
  Semi-continuous liquid volume = 270 liters
  Reaction temperature from 35° to 38° C., average temperature = 36.5° C.
  Reaction pressure = 4 atmospheres absolute
  Slurry recycle = 3840 to 3960 liters per hour
  Total gas flow rate equals 80 cubic meters per hour (STP), $NO_x$ content about 9% by volume, and
  Incremental manganese ore slurry additions = 5 kilograms manganese ore per 18 liters of water No nitric acid was initially added in this experiment; $NO_x$ gas is as previously defined.

Figure 8:
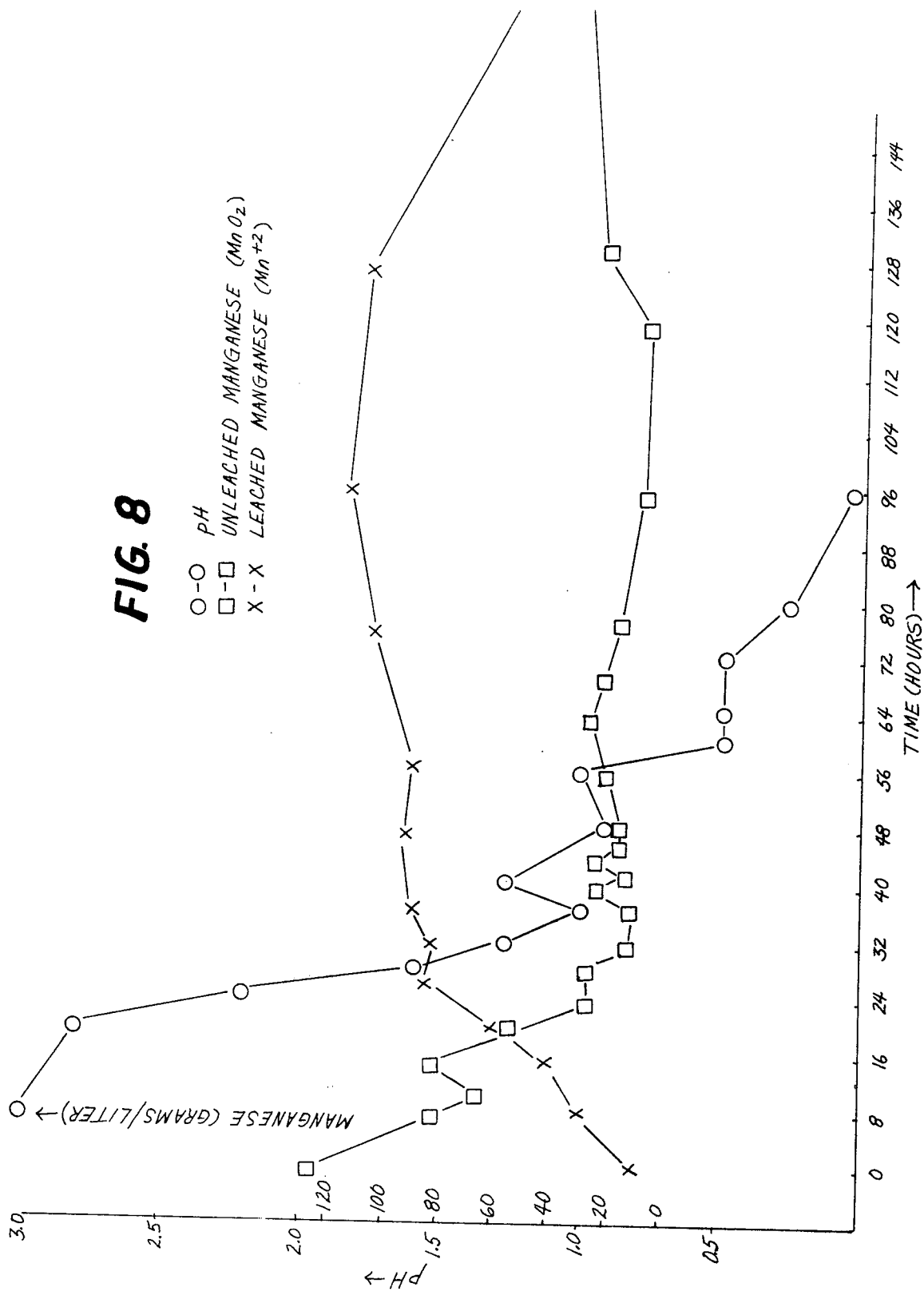
FIG. 8 illustrates in graphical form data from a semi-continuous process run under atmospheric pressure. The rate of introduction of manganese ore feed was again used as the means for controlling the concentration of excess manganese ore.

The advantages of operating the present process of preparing manganese nitrate solution under greater than atmospheric pressure are demonstrated by the comparative experiment illustrated in FIG. 8. It will be observed from FIG. 8 that it took about 40 hours to stabilize the reaction under atmospheric pressure. The gas flow rate in this comparative experiment was 73 cubic meters per hour, compared with about 80 cubic meters per hour in the pressurized semi-continuous process runs illustrated in FIGS. 6 and 7. It is observed from FIG. 8 that approximately six times the reaction (leach) tank volume under atmospheric pressure is required to maintain approximately the same pH level relative to the unleached manganese concentration. This demonstrates the advantage of conducting the process of the present invention under greater than atmospheric pressure, as discussed above.

As can be seen from FIG. 8, after an initial stabilizing period a manganese ore feed rate of 17.5 kilograms per hour produced an approximately stable reaction system at a pH of 0.5 to 1.0, and an unreacted manganese ore concentration of about 20 grams per liter up to about 72 hours. When the manganese ore feed rate was decreased to 8.8 kilograms per hour, it was found that the pH of the reaction system dropped to 0 or below, and that the unreacted manganese concentration dropped to about 5 grams per liter. Readjusting the manganese ore feed rate to 17.5 kilograms per hour brings the reaction system back to a stable condition. The experimental conditions illustrated in FIG. 8 are set forth below:

FIG. 8

Reaction tank contents:
  Reaction (leaching) tank volume = 1700 liters
  Reaction temperature = 30° C.
  Reaction pressure = 1 atmosphere absolute
  Absorption column pressure = 4 atmospheres absolute
  Slurry recycle = 3430 liters per hour
  Total gas flow rate = 73 cubic meters per hour (STP); $NO_x$ content about 9% by volume No nitric acid was initially added in this experiment; $NO_x$ gas is as previously defined.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A non-cyclic process of preparing manganese nitrate solution from a manganese ore containing manganese dioxide, comprising the steps of:
    contacting a nitrogen dioxide containing gas with an aqueous medium and dissolving said nitrogen dioxide gas to form an aqueous nitrous acid-containing medium,
    introducing said aqueous nitrous acid-containing medium and also introducing a manganese ore containing manganese dioxide into a closed reaction tank, and contacting said manganese ore with said aqueous nitrous acid-containing medium in said closed reaction tank,
    leaching said manganese ore containing manganese dioxide with said aqueous nitrous acid-containing medium at a pH below about 4 and a temperature below about 80° C., to form a manganese nitrate solution,
    adjusting a relative rate of addition of nitrogen dioxide containing gas and manganese ore containing manganese dioxide into said aqueous nitrous acid-containing medium to continuously control the concentration of nitrous acid and consequently to continuously decompose a controlled amount of nitrous acid to form nitric oxide, and
    monitoring and maintaining the pH of said aqueous nitrous acid-containing medium by adjusting the relative rate of addition of nitrogen dioxide containing gas and manganese ore containing manganese dioxide to maintain a continuous, controlled decomposition of nitrous acid to form nitric oxide.

2. The process of preparing a manganese nitrate solution set forth in claim 1 including leaching said manganese ore containing manganese dioxide with said aqueous nitrous acid-containing medium at a pH below about 3.

3. The process of preparing a manganese nitrate solution set forth in claim 1 including leaching said manganese ore containing manganese dioxide with said aqueous nitrous acid-containing medium at a pH in the range of about 0.0 to about 1.5.

4. The process of preparing a manganese nitrate solution set forth in claim 1 wherein the pH in said aqueous nitrous acid containing medium is periodically adjusted by adjusting the relative rates of introducing said nitrogen dioxide gas and said manganese ore containing manganese dioxide into said closed reaction tank to maintain a continuous, controlled decomposition of nitrous acid to form nitric oxide.

5. The process of preparing a manganese nitrite solution set forth in claim 4 wherein the pH in said aqueous nitrous acid containing medium is periodically adjusted by varying the rate of introducing nitrogen dioxide gas into said closed reaction tank, the rate of introducing said manganese ore containing manganese dioxide being held constant.

6. The process of preparing a manganese nitrate solution set forth in claim 4 wherein the pH in said aqueous nitrous acid containing medium is periodically adjusted by varying the rate of introducing manganese ore containing manganese dioxide into said closed reaction tank, the rate of introducing said nitrogen dioxide gas being held constant.

7. The process of preparing a manganese nitrate solution set forth in claim 1 including maintaining said aqueous medium in said closed reaction tank under a pressure of over one atmosphere absolute.

8. The process of preparing a manganese nitrate solution set forth in claim 1 including maintaining said aqueous medium in said closed reaction tank under a pressure of from about one atmosphere absolute to about ten atmospheres absolute.

9. The process of preparing a manganese nitrate solution set forth in claim 1 including maintaining said aqueous medium in said closed reaction tank under a pressure of from about five atmospheres absolute to about ten atmospheres absolute.

10. The process of preparing a manganese nitrate solution as set forth in any one of claims, 1, 2, 4, 6 or 9 including recovering manganese nitrate solution from said closed reaction tank at a manganese nitrate concentration less than about 50% by weight.

* * * * *